United States Patent [19]

Raetz

[11] 4,300,531

[45] Nov. 17, 1981

[54] SUNLIGHT COLLECTOR

[76] Inventor: Karlheinz Raetz, Gassnerstr. 12, 3300 Braunschweig, Fed. Rep. of Germany

[21] Appl. No.: 937,983

[22] Filed: Aug. 30, 1978

[30] Foreign Application Priority Data

Sep. 3, 1977 [DE] Fed. Rep. of Germany ....... 2739797

[51] Int. Cl.³ .............................................. F24J 3/02
[52] U.S. Cl. .................................. 126/417; 126/446; 126/450; 126/901
[58] Field of Search ............... 126/418, 422, 444, 446, 126/449, 450, 901, 417

[56] References Cited

U.S. PATENT DOCUMENTS

| 4,051,833 | 10/1977 | Vandament | 126/450 |
| 4,089,324 | 5/1978 | Tjaden | 126/901 |
| 4,099,517 | 7/1978 | McRae | 126/450 |
| 4,123,883 | 11/1978 | Barber, Jr. et al. | 126/450 |
| 4,144,872 | 3/1979 | Harrison | 126/901 |
| 4,150,659 | 4/1979 | Buckley | 126/422 |
| 4,167,935 | 9/1979 | Severson | 126/450 |

FOREIGN PATENT DOCUMENTS

| 237550 | 10/1960 | Australia | 126/901 |
| 2615686 | 10/1976 | Fed. Rep. of Germany | 126/901 |

Primary Examiner—James C. Yeung
Assistant Examiner—Larry Jones

[57] ABSTRACT

A sunlight collector comprises a main frame carrying a highly transparent glass covering and a collector element in parallel spaced relationship, the collector element comprising a support element with a liquid channel therein and convex leg curved towards the glass covering a foil coated with a coating of a high degree of blackness and held on the support element in a detachable manner.

13 Claims, 5 Drawing Figures

SUNLIGHT COLLECTOR

The invention relates to a sunlight collector in such a collector may be in the form of a box in which a highly transparent glass covering is mounted on a main frame, which carries a collector element parallel thereto and at a spacing herefrom which collector element has a channel for liquid and a coating of a high degree of blackness, a heat-insulating plate is also mounted in the main frame at a spacing from and parallel to the collector element. The area between the glass covering and the collector element is sealed off in a gas-tight manner on all sides and is connected to a pressure balancing container via a connecting line, while the area between the collector element and the insulating plate can be connected to the surrounding air via thermostatically controlled valves in order to provide a throughflow channel for fresh air in a region in which air is heated up and would otherwise be stationary.

Sunlight collectors of this type have been known which are equipped either with a single plate or double plate glass covering and in which additional elements are installed in the form of rasters or honeycombs between the collector element and the glass covering in order to avoid, as far as possible, any energy loss from the collector element due to convection (German Offenlegungsschrift No. 2,452,070).

The collector element absorbing the sunlight must either be provided with a dark black layer or with a so-called black selective layer. A chromium-chromium oxide layer ($Cr_2O_3$) for example is considered as this sort of selective layer and is applied to a high-sheen surface of the collector element.

The black selective coating of the collector element has the advantage over the deep black coating of the element in that a considerable reduction in the degree of emission is of heat radiation from the element is achieved without it being necessary to provide a considerable reduction in the degree of blackening.

The collector elements must be constructed relatively stable in order to achieve sufficient resistance to deformation and are either double-walled or are equipped with metal pipes for the liquid conducting the heat away on their side remote from the coating. In order to coat these elements, expensive apparatus is necessary since electrolytic baths must be designed to cope with the dimensions of the elements and a high vacuum vaporization is only possible with chambers of appropriate size, which chambers need to be evacuated so that the maintainance of the vacuum is very expensive. The use of large area collector elements leads to further difficulties with respect to the thermal expansion of the collector element which occurs with the temperature differences arising of approximately $-20°$ C. to approximately $+180°$ C.

In order to avoid the difficulties already mentioned, sunlight collectors of a different type have been developed which are equipped with vacuum tubes instead of a collector element, these being arranged close adjacent each other and being provided over half of their inner peripheral area with a deep black or black selective coating. However, these collectors are relatively expensive because of the tubes used so that economic manufacture is difficult.

SUMMARY OF THE INVENTION.

It is an object of the present invention to construct a sunlight collector in which the difficulties mentioned above for a large area construction can be avoided or reduced in respect of coating the collector element, and taking up the thermal expansion of the element and economic manufacture of the collectors is facilitated.

According to the invention, there is provided a sunlight collector comprising a main frame, a highly transparent glass covering mounted on said main frame and a collector element mounted in said main frame generally parallel to and spaced from said glass covering and comprising a support element curved convexly towards said glass covering, a foil spanning said support element, a coating of a high degree of darkness on said foil and liquid channel means in said support element for removal of heat from said support element.

BRIEF DESCRIPTION OF THE DRAWINGS

The invention will now be described in greater detail, by way of example, with reference to the drawings, in which.

DESCRIPTION OF THE PREFERRED EMBODIMENTS

Figure 1:
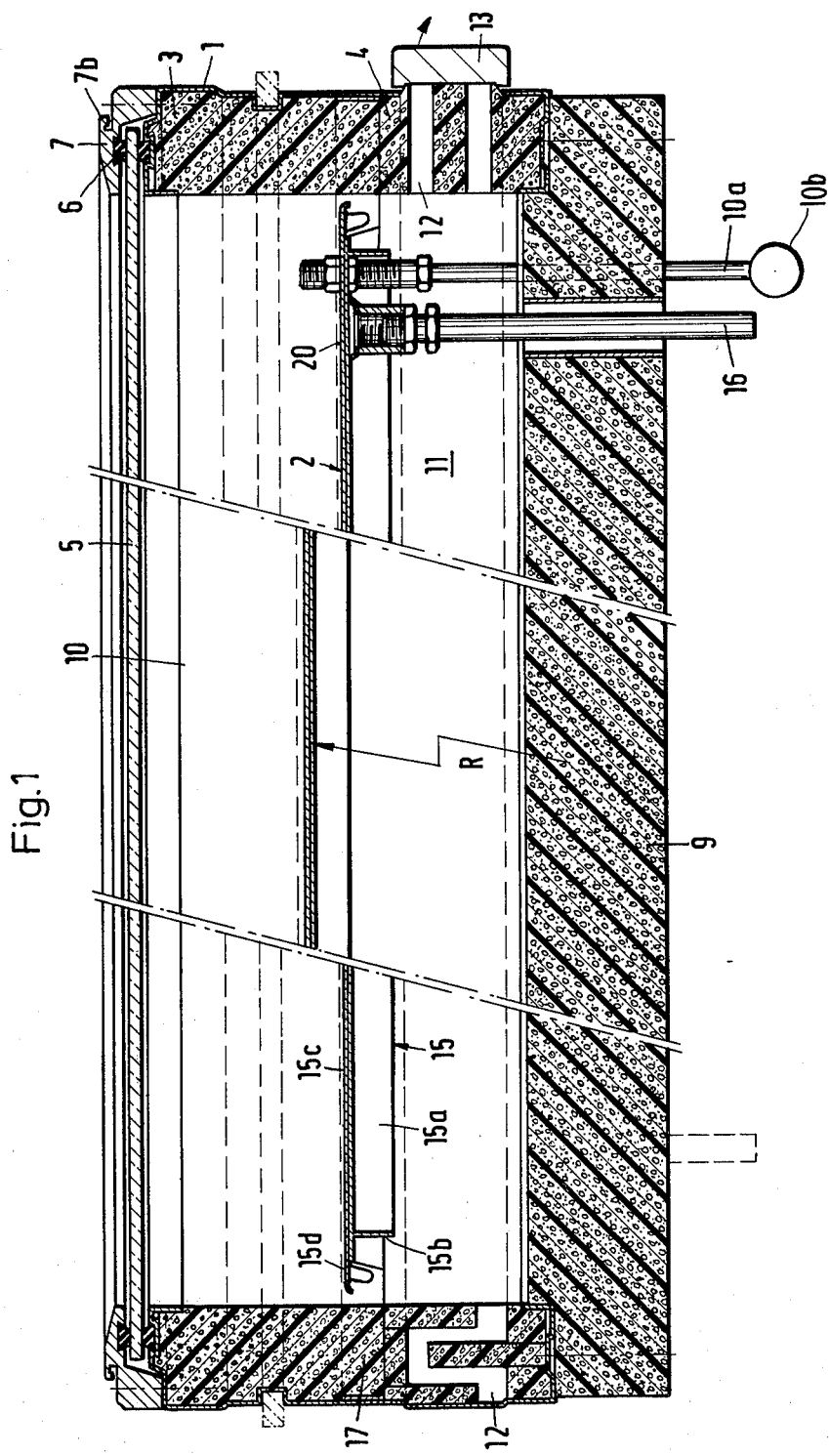
FIG. 1 shows a partially interrupted longitudinal section through a sunlight collector in accordance with the invention.

In a preferred embodiment of the invention, in a sunlight collector as mentioned at the outset, the collector element comprises a sheet metal support element which is convexly curved in the direction of the glass covering and has a foil coated with a black or black selective coating and spanning the support element, whereby the support element is attached to the main frame with by means of a resilient profiled frame which takes up the thermal expansion and the foil is detachably retained in a pressed in position on the support element.

As a result of the new type of construction of the collector element from the support element and the foil spanning the support element and firmly pressed against the support element, the support element and the foil can be manufactured separately from each other. Thus the coating of foil can be produced for example in a continuous throughput method with the aid of relatively simple devices, known in their basic construction, using a high vacuum vaporization plant or by drawing through an electrolytic bath so that the application of the coating to the foil can take place substantially more rationally than the coating of the collector elements previously practised. The coated foil can be fixed to the support element without great difficulty as a result of the curving of the support element described with the aid of suitable tensioning devices so that the foil rests with its surface on the sheet metal support element. Tests have shown that, in this arrangement, negligible heat transition losses occur in comparison to collector elements having a coating applied direct thereto.

The curving of the support element is carried out generally only in one dimension and in fact preferably in the direction of the largest longitudinal axis of the collector.

The foil must comprise a material which is a good conductor of heat so that metalic materials having a high heat conductance, such as copper, are preferred.

The detachable fixing of the coated foil to the support element has the great advantage that the foil can be exchanged after many years of use, for example if the coating no longer leads to the desired effect because of contamination or if the collector is to be operated with another coating corresponding to the latest state of the art.

It is particularly desirable if springs for retaining the foil in its tensioned and pressed in position are provided between the edge of the foil and the edge of the support element. In the case of different coefficients of expansion of the foil and of the support element, these springs ensure that the foil is always maintained in its pressed in position against the support element and thus only small resistance to conduction heat occurs.

A particularly simple construction is achieved if the support element of the collector element is constructed with two walls and comprises a profiled lower part having an angled portion at its edge and a covering plate which is not profiled and is connected thereto this covering plate having a portion projecting beyond the angled edge of the lower part. The springs engaging the foil can then be connected at their ends to this projecting portion. Simple attachment of the springs to the foil can be achieved if the foil is equipped with spring metal edge strips which are on opposite sides of foil in the curved direction, these edge strips each having a hook-shaped rolled portion for positive engagement with the springs. Thus it is advantageous to construct the springs as profiled strips which are U-shaped in cross-section and extend along the edges of the foil.

The resilient profiled frame which is connects the support element of the collector element to the main frame can be manufactured advantageously from noble steel and attached to the lower part of the collector element by a limb which runs parallel to the collector element, this limb being integral with a part of U-shaped cross-section the base of the U being directed towards the main frame with the adjacent upright being connected thereto.

As a result of the resilient profiled frame being formed from noble steel, a small dissipation of heat is achieved from the profiled frame to the main frame. Moreover, the resilient profiled frame has an extremely small coefficient of expansion as a result of this selection of material. The heat expansion of the support element of the base is taken up in this way almost exclusively by the resilient part provided by the U-shaped cross-section.

In another advantageous refinement, the resilient profiled frame may be constructed to be approximately Z-shaped in cross-section and attached to the lower part of the collector element by a free linb, whereby the other free limb is provided with an angled portion running in parallel to the base frame and is connected to the base frame. With this refinement, a particularly high stability of shape is achieved by the Z-shaped formation of the resilient profiled frame besides as well as retaining the resilient characteristic of the frame.

Referring now to the drawings a collector for sunlight is shown in section in FIG. 1. It is rectangular in cross-section and may have dimensions 1,200×2,400 mm, for example. FIG. 1 represents a section parallel to the major longitudinal axis of the sunlight collector.

The collector has a main frame 1 made of steel which is preferably treated with zinc hromate. It is approximately U-shaped in its cross-section and is provided both above and below a collector element 2 with portions 3 and 4 of foam material.

A highly transparent glass covering 5 is retained on the main frame 1 and, in this embodiment, is a simple glass plate. In the upper limb of the main frame 1 as shown in the drawings, a seal 6 projecting outwardly of the limb of the U-shaped profile is provided in an undercut groove, the glass covering 5 being pressed against this seal 6 by a seal 8 arranged in a surrounding press strip 7.

An insulating plate 9 comprising foamed plastics material is provided on the free limb of the U-shaped profile of the main frame 1 opposite to the glass covering 5 at an appropriate spacing from the collector element 2, this insulating plate 9 being connected to this limb which is the lower limb in the drawing.

The collector element 2 is connected to the main frame 1 around its edges and subdivides the chamber surrounded by the main frame 1 into an upper chamber 10 sealed off towards from the outside in a gas tight manner and a lower chamber 11 located between the collector element and the insulating plate 9.

A balancing line 10a connects the gas-tight chamber 10 to a pressure balancing vessel 10b.

The chamber 11 between the collector element 2 and the insulating plate 9 is constructed so that it can act as a throughflow channel for fresh air in order to avoid overheating of the collector element in the case of the lack of removal of heat from the collector element 2. To this end, bores 12 are provided in the main frame 1 and in the foamed plastics portion 4 i.e. on the side of the collector element on which the heat accumulates during operation of the collector. The bores 12 are closed by a thermostatically controlled valves 13 shown schematically in the drawings and only opened if the temperature of the collector base rises above a predetermined value.

The collector element 2 of the arrangement in accordance with FIG. 1 is curved convexly towards the glass covering 5 with a radius R, which is indicated by an arrow in the central region of the collector element of FIG. 1. This curving is only in one dimension in the embodiment shown and only amounts to a displacement of a few centimeters in a collector of 1,800–2,400 mm in length.

The collector element 2 in accordance with this embodiment comprises a convexly curved support element 15 of double walled construction. A lower part 15a is profiled and is provided with an angled edge portion 15b. The upper part on the other hand is constructed as a non-profiled covering plate 15c which projects over the lower part 15a at its edge angled portion 15b so that there is formed a projecting portion 15d. The lower part 15a has a profiled portion facing the covering plate 15c in the form of flow channels arranged parallel to each other so that throughflow ducts (not shown) are formed between the parts 15a and 15b in the drawing, these throughflow ducts being connected to water supply and outlet lines, are of which is shown at 16, connected to the lower part 15a. The paths of the flow channels between the lower part 15a and the covering plate 15c are arranged in the usual manner and need not be described in greater detail here.

The lower part 15a and the covering plate 15c are connected together so as to be circumferentially pressure-tight so that the water flowing through between these two parts can be conveyed at a predetermined pressure.

The support element 15 is connected to the base frame 1 via a resilient profiled frame 17. The detailed construction of the resilient frame 17 is apparent from FIG. 2. The resilient profiled frame 17 comprises noble steel and has a limb 17a running parallel to the wall of the base frame 1, said limb being welded to the base frame 1. This limb 17a forms one limb of a U-shaped portion, the other limb of which terminates in a further limb 17b which runs parallel to the covering plate 15c and is welded thereto. A Z-shaped construction 18 shown in broken lines in FIG. 2 may replace the appropriate part of the frame 17, fastening of this embodiment 18 takes place in the same manner as is described for the U-shaped suspension frame 17.

The covering plate 15c of the support frame 15 is covered by a foil 19 which is formed preferably as a copper foil which has a black or black selective coating on its side facing the glass covering 5. The foil 19 is provided with a spring steel plate 20 at its opposite edges at the non curved sides of the support element 15, the said plate 20 (merging into) a rolled portion 21 at its free end. A U-shaped spring 22 engages in this rolled portion with its free end 22a, the other end 22b being attached to the underside of the covering plate 15c preferably by welding. The foil 19 is extremely tightly tensioned because of these U-shaped springs 22 which extend along the corresponding edges of the foil 19 in the form of profile strips and pressure of the foil 19 against the covering plate 15 is achieved as a result of the curving of the support element 15 and thus also of the cover plate 15c even if the foil and the covering plate should have different thermal expansions. These are compensated by the springs 22.

Figure 2:
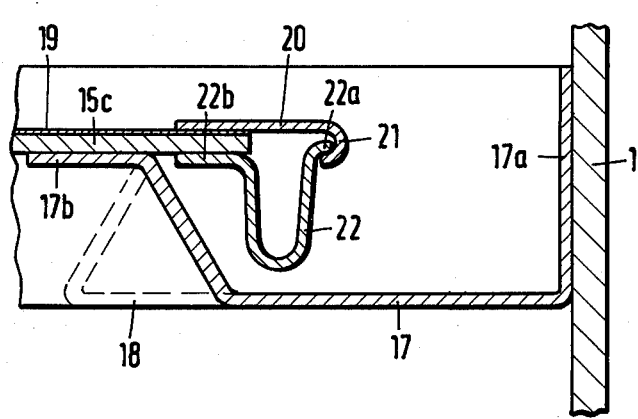
FIG. 2 shows a detail of the arrangement of FIG. 1.
Figure 3:
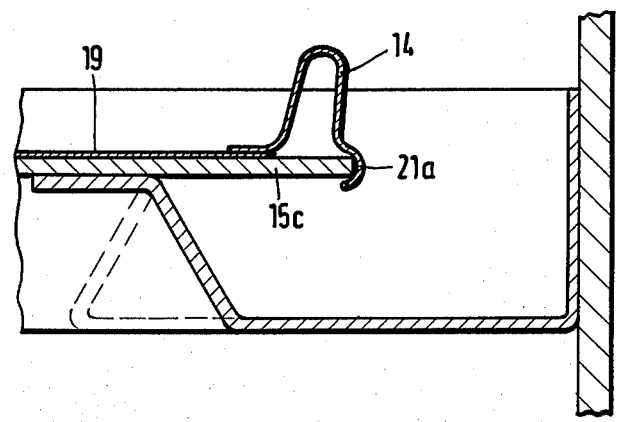
FIG. 3 shows a modified form of the detail shown in FIG. 2.

The fixing of the foil in accordance with FIG. 3 can take place by means of a single spring strip 14 instead of the means shown in FIG. 2, the strip 14 being welded to the foil 19 and hooked on to the cover plate 15c by means of a rolled portion 21a. The spring 14 is U-shaped in order to produce the spring action.

Because the foil 19 is only tensioned across the cover plate 15c it is easily exchangeable when the springs 22 or 14 are released and the foil can be removed from the cover plate 15c. Therefore, there is the possibility of exchanging the foil 19 in the case of contamination or ineffectiveness of the black or black selective coating or of using foils having new coating materials when new coating materials are developed.

The coating of the foil can be carried out in a continuous process as compared to the processes necessary for the rigid elements the foil being passed through appropriate coating zones.

With the described tensioning of the foil 19 and its pressure against the cover plate 15c, with appropriate shaping of the cooperating surfaces of the previously mentioned parts, an extremely favourable heat contact is produced so that heat conduction losses caused thereby are negligibly small when compared to collector bases elements which have been directly coated.

It is thus possible to manufacture relative large-area sunlight collectors at a favourable price owing to this new embodiment.

Since several sunlight collectors in each case have to be arranged in series and/or in parallel to each other in order to achieve sufficient energy yield and since on the other hand the exchange of foils is to be facilitated with the new embodiment it is necessary to create an easily disconnectable connection device for the collectors which however prevents water from penetrating between the adjacent collector walls.

Figure 4:
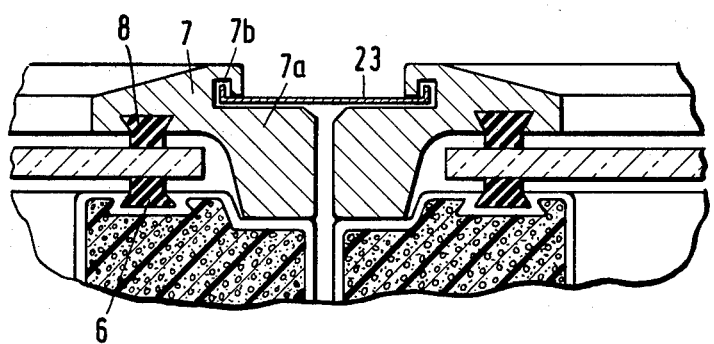
FIG. 4 shows a vertical section through adjacent edges of two collectors arranged in series.
Figure 5:
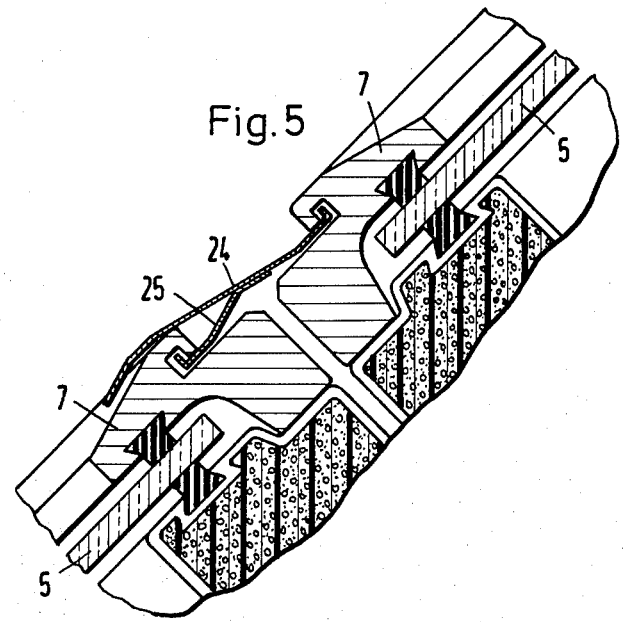
FIG. 5 shows a vertical section through the edges of two inclined collectors arranged one after the other in the direction of inclination.

The press strip 7 cooperating with the glass covering 5 is utilized for this purpose in the new collector. This press strip is screwed to the upper edge of the main frame 1 and has, in accordance with FIG. 4 a limb 7a running perpendicular to the general plane of the collector with a longitudinal recess 7b formed behind it into which a U-shaped covering profile 23 engages. This covering profile 23 extends up to the press strip 7 of the sunlight collector directly adjacent and engages into the appropriate recess 7b of this press strip. As a result, the sunlight collectors for are connected together at their upper ends whereby, at the same time, the screw positions between the press strips 7 and the main frame 1 of the collector are covered. As long as the U-shaped covering profiles 23 lie with their longitudinal directions in the direction of the gradient, then no additional sealing off is necessary. But when they lie crosswise to the direction of the gradient, and at the intersection points, for example with four sunlight collectors joined together in a block, a covering profile 24 should be used which overlaps the press strip 7 of the lower collector (FIG. 5). This contains a plate strip 25 which is welded from below, said plate strip ensuring fixed abutment of the covering profile 24 on the press strip 7 of the lower collector. The ends of the covering profiles 23 which lie longitudinally of the upper collectors are pushed over the covering profile 24 and the ends of the covering profile 23 which lie longitudinally of the lower collectors are pushed underneath the covering profile 24.

It will be understood that the above description of the present invention is susceptible to various modification changes and adaptations.

What is claimed is:

1. A solar collector comprising a main frame, and a collector element, said main frame having side walls and top covered by highly transparent glass, and a bottom support for said collector element, said bottom support being curved convexedly upward and having liquid channel means for removal of heat from said bottom support, said collector element comprising a foil spanning said bottom support, having a coating of a high degree of darkness on its upper surface, and means for removably placing said foil in tensioned contact with the convexedly curved surface of said bottom support.

2. A collector as defined in claim 1 wherein said bottom support is mounted in a resilient frame connected to said main frame to permit thermal expansion of said bottom support.

3. A collector as defined in claim 2, including a thermal insulation plate carried by the main frame parallel to and spaced between the collector element and the top of said main frame, and thermostatically controlled valves enabling circulation of air to the space between said thermal insulation plate and said collector element.

4. A collector as defined in claim 3, including means for sealing the space between said glass covering and said collector element in gas tight manner and a balancing container connected to said space.

5. A collector as defined in claim 3, wherein said main frame comprises a frame of U-shaped cross-section enclosing foamed plastics material, said resilient frame extending therethrough and including a first free limb for attachment of the glass covering and a second free limb for attachment of said thermal insulation plate.

6. A collector as defined in claim 3, wherein the main frame comprises a U-shaped cross-section inclosing a foamed plastics material defining openings between said collector element and said insulation plate, labyrinth like element in said openings and thermostatic control valves controlling said openings.

7. A collector as defined in claim 1 wherein said means for attaching said foil includes springs acting between said foil and the edge of said bottom support for tensioning and pressing said foil against said bottom support.

8. A collector as defined in claim 7, wherein said bottom support is double walled and comprises a profiled lower part having an angled portion at its edge and a covering plate connected thereto having a portion projecting beyond the angled edge portion of said lower part for connection with said springs.

9. A collector as defined in claim 8, wherein said resilient frame comprises noble steel and includes a limb running parallel to said bottom support fixed to said profiled lower part, a U-shaped member integral with said limb and connected thereto at the end of one leg of the "U" shaped member and a second limb forming the other leg of the "U" shaped member running parallel to and attached to said main frame.

10. A collector as defined in claim 8, wherein said resilient frame comprises a frame of approximately Z-shaped cross-section including a first limb provided by one of the outer members of the Z fixed to said profiled lower part of said bottom support and a second limb provided by an angled portion at the end of the other outer member of the Z running parallel to and connected to said main frame.

11. A collector as defined in claim 7, including spring metal edge strips lying on opposite sides of the foil and having hook shaped rolled portions for positive engagement with said springs.

12. A collector as defined in claim 7, wherein said springs comprise profiled strips of U-shaped cross-section extending along the edges of the foil.

13. A collector as defined in claim 1 including a press strip for said glass covering including a line running perpendicular to said glass covering and defining a recess therebehind and a U-shaped covering profile engaging in the recesses of two adjacent press strips of adjacent collectors.

* * * * *